3,295,659
HOPPER-TYPE FEEDING AND ORIENTING DEVICE FOR BOTTLES OR THE LIKE
Samuel S. Aidlin, New York, N.Y.
(214 Beaumont St., Brooklyn, N.Y. 11235)
Filed Mar. 2, 1965, Ser. No. 436,527
5 Claims. (Cl. 198—33)

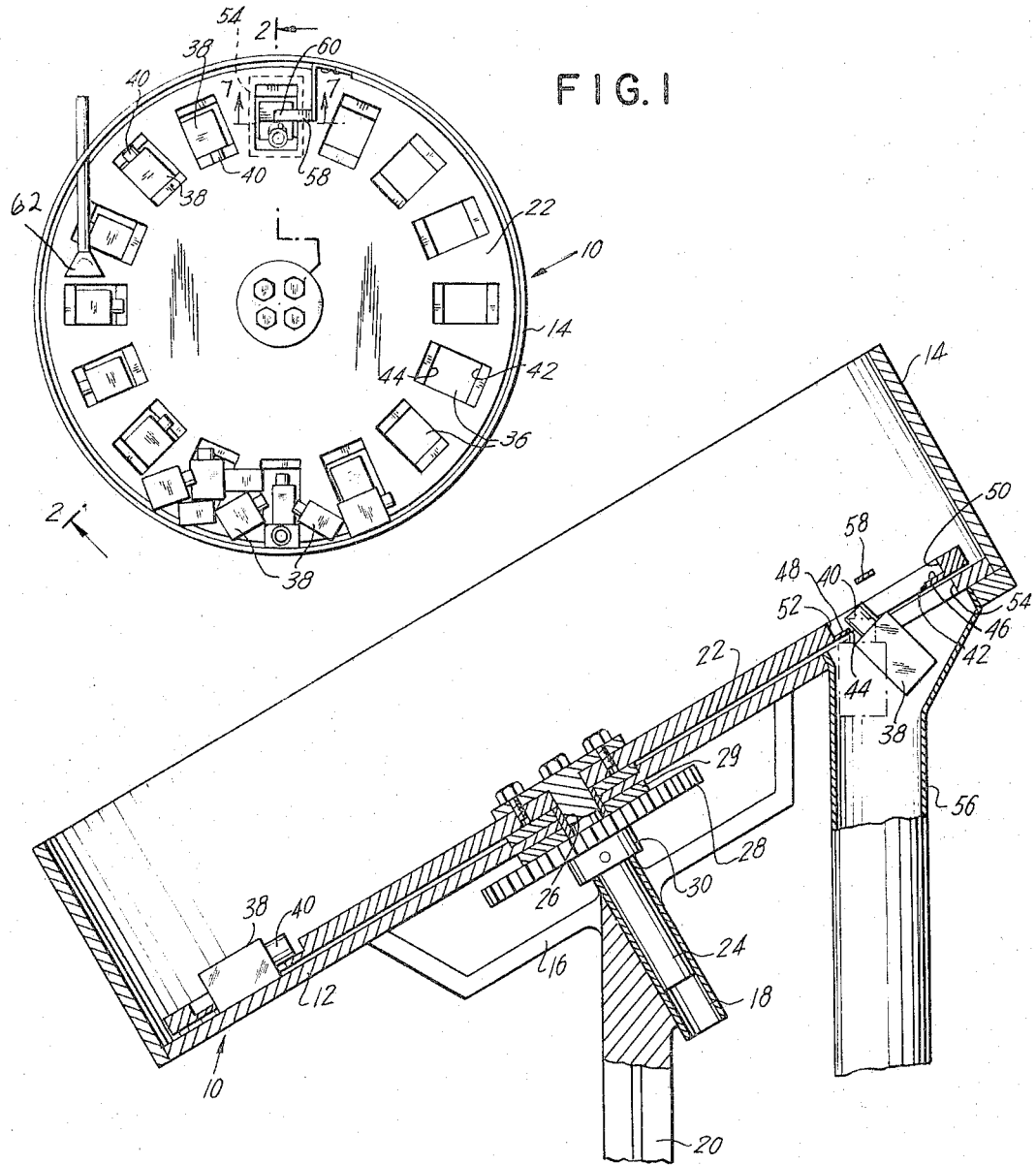

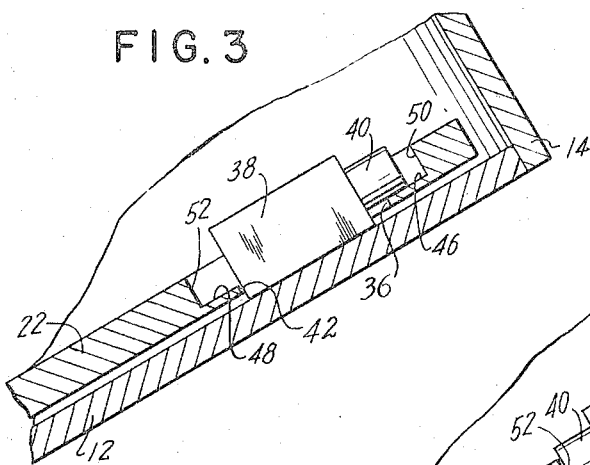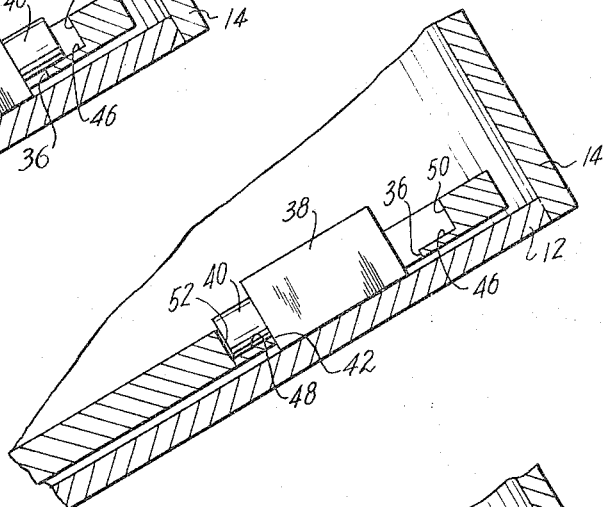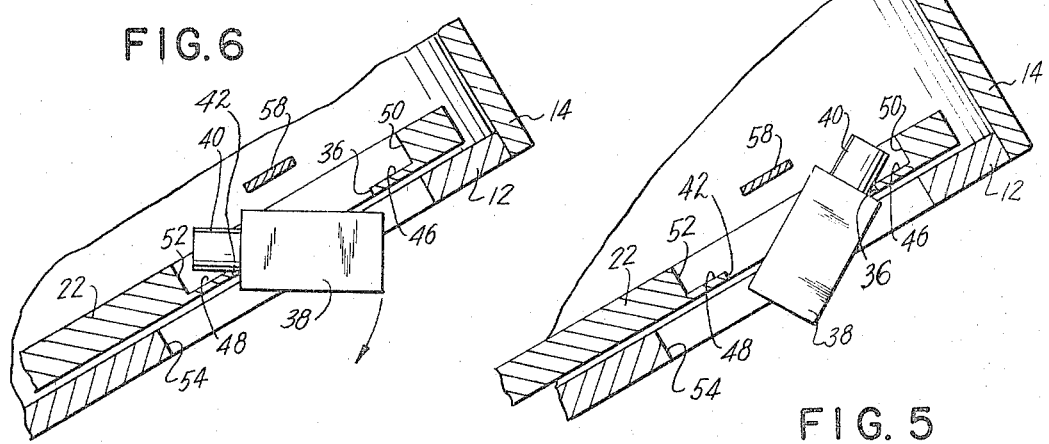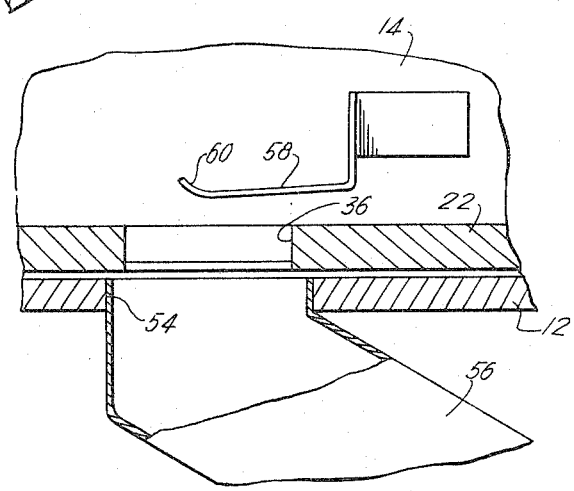

The present invention relates to hopper feed apparatus, and more particularly to hopper feed apparatus for feeding, in uniformly oriented relation, bottles or similar articles having one end portion of greater thickness or cross-section than its other end portion.

Hopper apparatus for feeding irregularly-shaped articles in oriented position, as heretofore provided, generally operated on the principle of picking up the articles from a scrambled pile at the bottom of the hopper, in haphazard position, as by a rotary collector member which brought the articles to the top of the hopper, at which point only those in properly oriented position were discharged into a chute that led from the interior of the hopper to the exterior over or through the wall of the hopper; those articles not properly oriented in the collector being prevented from entering the chute and returned to the hopper.

The present invention is directed to hopper feed apparatus, of the character described, in which the articles, regardless of how they are oriented in the rotary collector member, are all discharged from the hopper in uniform position with thicker end foremost, to thereby attain discharge of each article picked up by the collector ring and, consequently, more rapid feeding of articles from the hopper.

The present invention is also directed to the provision of hopper feed apparatus, of the character described, which may be installed for greater convenience for association with equipment to which the articles are fed and for greater and more convenient accessibility to the person in control thereof.

The present invention is additionally directed to the provision of hopper feed apparatus, of the character described, which is of relatively simple construction, utilizing a minimum number of parts that may be easily assembled, to thereby provide apparatus that is economical to produce.

The present invention is further directed to the provision of apparatus, of the character described, which is compact, strong and sturdy; certain in its operation, and will require a minimum of maintenance and care.

The foregoing and other objects and advantages of the hopper feed apparatus of the present invention will become more readily apparent to those skilled in the art from the embodiments thereof shown in the accompanying drawing, and from the description following. It is to be understood, however, that such embodiments are shown by way of illustration only, to make the principles and practice of the invention more readily comprehensible and without any intent of limiting the invention to the specific details therein shown.

In the drawings:

FIG. 1 is a top plan view of one embodiment of a hopper feed apparatus of the present invention;

FIG. 2 is an enlarged, more or less diagrammatic, sectional view, through the apparatus, taken on line 2—2 of FIG. 1;

FIG. 3 is a fragmentary, more or less diagrammatic sectional view, on a still more enlarged scale, of the apparatus, showing a bottle or like article carried by the collector disc with the reduced end or neck of the article disposed in one direction;

FIG. 4 is a view similar to that of FIG. 3, showing the article disposed in the collector ring with its reduced end or neck pointing in the opposite direction;

FIG. 5 is a view similar to that of FIG. 3, illustrating the discharge of the article of FIG. 3 from the hopper, bottom first;

FIG. 6 is a view similar to that of FIG. 4, showing discharge of the article of FIG. 4 from the hopper, bottom first; and FIG. 7 is a fragmentary, sectional view, on an enlarged scale, taken on line 7—7 of FIG. 1.

Generally stated, the apparatus of the present invention takes advantage of the variations of thickness in the end portions of articles to collect the articles in radially-disposed openings extending through a collector disc which are of a length less than the total length of the article but greater than the length of the thicker portion thereof, so that in whatever position the article is disposed within the radial opening, its neck portion will overlie a marginal edge portion of the opening and the end of its thicker portion will abut the opposed end of the openings; the article in each of the openings in the rotary collector disc will drop through an opening in the stationary bottom of the hopper, bottom first, into a chute or other conveyance provided below the stationary bottom of the hopper.

Referring now, in greater detail, to the embodiment of the invention illustrated in the drawings, the same is shown to comprise an open-top hopper, generally designated as 10, including a bottom wall, 12, and a cylindrical wall, 14, secured thereto. The hopper 10 is mounted in fixed position, as by its bottom wall 12, at a conveniently appropriate angle to the horizontal, as on the bracket arms, 16, extending from a bearing sleeve, 18, secured at an angle to a standard, 20, or like upright support, which may be rested on a table or floor.

Rotatably supported within the hopper 10, in close proximity to its bottom wall 12, is a collector disc, generally designated as 22. The disc 22 has a shaft, 24, secured thereto at its center, which passes through an opening, 26, at the center of the hopper bottom 12 and may be rotatably journaled by its end portion in the bearing sleeve 18. The shaft 24 has secured thereto, between the bottom wall 12 and the upper end of the bearing sleeve 18, a gear wheel, 28, which is engageable from a source of power, such as an electric motor, not thought necessary to be illustrated, for rotation, to thereby rotate the collector disc 22 within the hopper 10. Suitable collars, 29 and 30, which may also serve as bearings, may be interposed, respectively, between the bear wheel 28 and the bottom wall 12 and the end of the bearing sleeve 18. Additional bearings such as may suggest themselves to anyone skilled in the art may be provided to facilitate rotation of the shaft 24 and disc 22.

The disc 22 is provided with a plurality of spaced radially-extending collector slots or openings, 36, arranged in a ring along the peripheral marginal edge portion of the disc; each slot or opening 36 serving as a seat for an article having one end portion thicker than its other end portion, such as the bottles, 38, having the necks, 40. The peripheral ring portion of the disc 22 in which the collector slots 36 are formed may be of appreciable thickness, so that each slot 36 may be of appreciable depth, preferably equal at least to a substantial proportion of the thickness of the thicker portion of the bottle 38, sufficient to retain the bottle therewithin. Each of the collector slots 36 is of a length, in a radial direction, equal at least to the height of the thick portion of the bottle 38, but less than the entire height of the bottle. Thus, when a bottle 38 is picked up in one of the collector slots 36 of the collector disc 22, from a pile of bottles at the bottom of the hopper 10, the thick portion of such bottle will be disposed in the slot 36, its bottom disposed adjacent an end wall of the slot 36, either its outer or inner end walls, 42, or 44, respectively, its neck overlying the marginal edge portion of the opposed end of the slot 36, and its side resting on the hopper bottom 12.

It may be desirable, especially when the bottles to be fed are of a type whose neck is not sharply defined from its thick body portion, to form a recess in the upper marginal edge portion at each radial end of the slots 36, as 46 and 48, whose inner walls, 50 and 52, may each be disposed at a distance from the wall at the opposed end of the slot 42 or 44, as the case may be, equal to the height of the bottle; neck included. While such recesses are shown to be of rectangular cross-section, and extending the entire width of the slot, it may here be stated, and it will be readily understood, that they may be of reduced width and either curved or V-shaped in depth. It will be clear that the provision of such recesses will make certain that the thicker portion of the bottles will be disposed wholly within the slots 36.

For discharging the bottles 38 from the hopper, there is formed at the upper end of the tilted hopper bottom 12, in what may be designated as "12 o'clock" position, an opening, 54, whose length, in a radial direction, is equal at least to the corresponding length of an opening 36 in the rotary collector disc 22 and in register with such opening, and of a width not less and preferably greater than the width of such disc opening 36.

It will be apparent that, in operation, as the disc 22 rotates, it will pick up bottles from the pile at the bottom of the hopper in each of the openings 36 thereof. Some of these bottles will be disposed with their necks facing the periphery of the disc and their bottoms abutting and supported by the end wall 42 of the opening, as shown in FIG. 3 of the drawings. Others of the bottles will be disposed with their necks facing the center of the disc and the shoulder defining the neck from the thick portion abutting the end wall 44 of the opening and the ends of their necks abutting the end wall 48 of the recess adjacent the end wall 44 of the opening, as shown in FIG. 4 of the drawing. It will be apparent that as each opening 36 moves over the opening 50 of the hopper bottom 12, support for the thick portion of the bottle 38 will be removed, while the neck 40 of the bottle, no matter how oriented, will remain in engagement over the marginal edge portion of the radial end of such opening, so that the bottle, no matter how oriented, will drop through the opening 54, thick part or bottom first, into a chute, 56, provided below the opening 54, as shown in FIGS. 5 and 6.

In order to be sure of completely discharging the bottle through the openings 54 before its collector slot 36 completely traverses the width of the opening 54, the latter may be made of a width that is appropriately greater than the width of a slot 36 and, additionally, physical means for positively ejecting the bottle through an opening 50 may likewise be provided. Such means may comprise a leaf spring, 58, supported, as by the wall 14 of the hopper, transversely across the opening 54 at a height to engage against a bottle 38 being moved over the opening 54, so that the latter is positively pushed by the spring through the opening 54, to expedite its discharge therethrough. It will be understood that the lead end, 60, of the spring 58 may be upwardly curved so as not to block the movement of the bottles 38.

Means may also be provided for clearing the collector disc 22 of any bottles lying across the openings 36 and not within them, to return such bottles to the bottom of the hopper or to place them squarely within one of the slots 36. Such means may comprise a nozzle, 62, supported over the peripheral ring portion of the disc 22 in suitably elevated relation thereto, such nozzle being supported in any suitable manner, as on wall 12, and being connectable to a source of compressed air which may be discharged through the nozzle to engage against bottles lying on top of the collector disc 22 to blow them back to the bottom of the hopper.

It may here be stated that suitable means, in the form of bearings or the like, may be provided on the surface of the bottom wall 12 for facilitating the movement of the bottles 38 resting and moved thereagainst and to prevent the mutual abrasion of such surface and bottles.

It may here also be stated that instead of the upright wall 14 being connected to the stationary bottom wall, 12, and the upright rotary peripheral ring section having the collector slots 36 being part of a rotatable disc concentric with the bottom wall 12, such ring section may instead be attached to a cylindrical wall which is independent of the bottom wall 12 and is rotatably supported thereabove; the driving means for the cylindrical wall and for the collector ring being secured to the cylindrical wall in a manner such as illustrated in my co-pending application Serial No. 226,102, now Patent No. 3,254,753, filed September 25, 1962.

This completes the description of the apparatus of the present invention. It will be readily apparent that such apparatus is of relatively simple construction and that it will be highly effective for the rapid feeding of bottles or like objects in oriented relation because of the fact that all rings picked up by the rotary collector are discharged from the hopper in oriented position and need not be in any selected position for that purpose.

It will likewise be readily apparent that because the fed articles are discharged through the bottom of the hopper, the chute into which they are discharged is, as a consequence, disposed wholly externally of the hopper and may be pointed in any desired direction, to thereby leave the hopper unobstructed for maximum accessibility, and provide greater convenience and flexibility in the direction of the bottles fed from the hopper.

It will be further apparent that numerous modifications and variations may be made in the apparatus of the present invention by anyone skilled in the art, in accordance with the principles of the invention hereinabove set forth, without the exercise of any inventive ingenuity. I desire, therefore, to be protected for any and all such variations and modifications that may be made within the spirit of the invention and scope of the claims hereto appended.

What I claim is:

1. Apparatus for orienting and feeding bottles or like articles having a portion of reduced cross-section at one end, comprising a hopper including a bottom wall secured in fixed position at an angle to the horizontal, a member rotatable over said bottom wall in parallel relation and in proximity thereto, said member including a ring section having radially-disposed spaced slots formed therein, each said slot of a length, in a radial direction, greater than the height of the thick portion of a bottle but less than the thickness of the thick portion of said bottle, each said slot having the upper marginal edge portion at each radial end thereof cut away to form a recess for the end of the neck portion of said bottle, an opening formed in said bottom wall at the top thereof arranged to have each said opening in said ring section register therewith in succession as said rotary member is rotated, said opening in said bottom wall being of a width not less than the width of an opening in said ring section, and means on said hopper within said opening in said bottom wall engaging the thick portion of a bottle in an opening of said ring section moving over said bottom wall opening and applying a downward force on said bottle to eject said bottle through said opening.

2. The apparatus of claim 1 wherein a chute for receiving and guiding bottles discharged through said bottom wall opening is provided below said bottom wall opening.

3. The apparatus of claim 1, wherein said opening in said bottom wall is of a width greater than the width of a slot in said ring section.

4. The apparatus of claim 1, wherein said means for positively ejecting said bottle through said openings comprises a leaf spring supported from said hopper transversely of said opening in said bottom wall in position to be engaged by a bottle moving thereunder.

5. The apparatus of claim 4, wherein the end of said leaf spring facing the direction of movement of said bottle is curved upwardly.

References Cited by the Examiner
UNITED STATES PATENTS

| | | | |
|---|---|---|---|
| 1,242,086 | 10/1917 | Von Henrique. | |
| 1,408,497 | 3/1922 | Bragdon. | |
| 1,644,999 | 10/1927 | Hardiman. | |
| 1,989,924 | 2/1935 | Hill. | |
| 2,777,561 | 1/1957 | Rose | 198—33.1 |
| 2,901,088 | 8/1959 | Evasic | 221—169 |

EVON C. BLUNK, *Primary Examiner.*

R. M. WALKER, M. L. AJEMAN, *Assistant Examiners.*